United States Patent [19]
Ho

[11] Patent Number: 5,806,726
[45] Date of Patent: Sep. 15, 1998

[54] WATER DISPENSER FOR SUPPLYING WATER TO THE MOUTH OF BICYCLISTS

[76] Inventor: Kuo-Ping Ho, P. O. Box 82-144, Taipei, Taiwan

[21] Appl. No.: 585,466

[22] Filed: Jan. 16, 1996

[51] Int. Cl.[6] ............................................. B67D 3/00
[52] U.S. Cl. ........................... 222/529; 222/107; 222/175
[58] Field of Search ................................ 222/608, 107, 222/175, 529, 105

[56] References Cited

U.S. PATENT DOCUMENTS

| | | | |
|---|---|---|---|
| 4,193,518 | 3/1980 | Holmes | 222/105 |
| 5,062,591 | 11/1991 | Runkel | 222/608 X |
| 5,085,349 | 2/1992 | Fawcett | 222/175 |
| 5,143,390 | 9/1992 | Goldsmith | 222/608 X |
| 5,201,442 | 4/1993 | Bakalian | 222/608 X |

*Primary Examiner*—Gregory L. Huson
*Attorney, Agent, or Firm*—Alfred Lei

[57] ABSTRACT

A water dispenser for bicyclists includes a container having a first slot at an upper side thereof, an outlet close to the upper side, an inlet close to a lower side thereof and provided with a cover, a valve arranged at the lower side, two inclined seams extending from respective vertical sides thereof to the valve, and two second slots at respective bottom corners thereof, a tube provided with a threaded connector at both ends and adapted to threadedly engage with the outlet at an end, and a nipple threadedly engaged with another end of the tube.

2 Claims, 10 Drawing Sheets

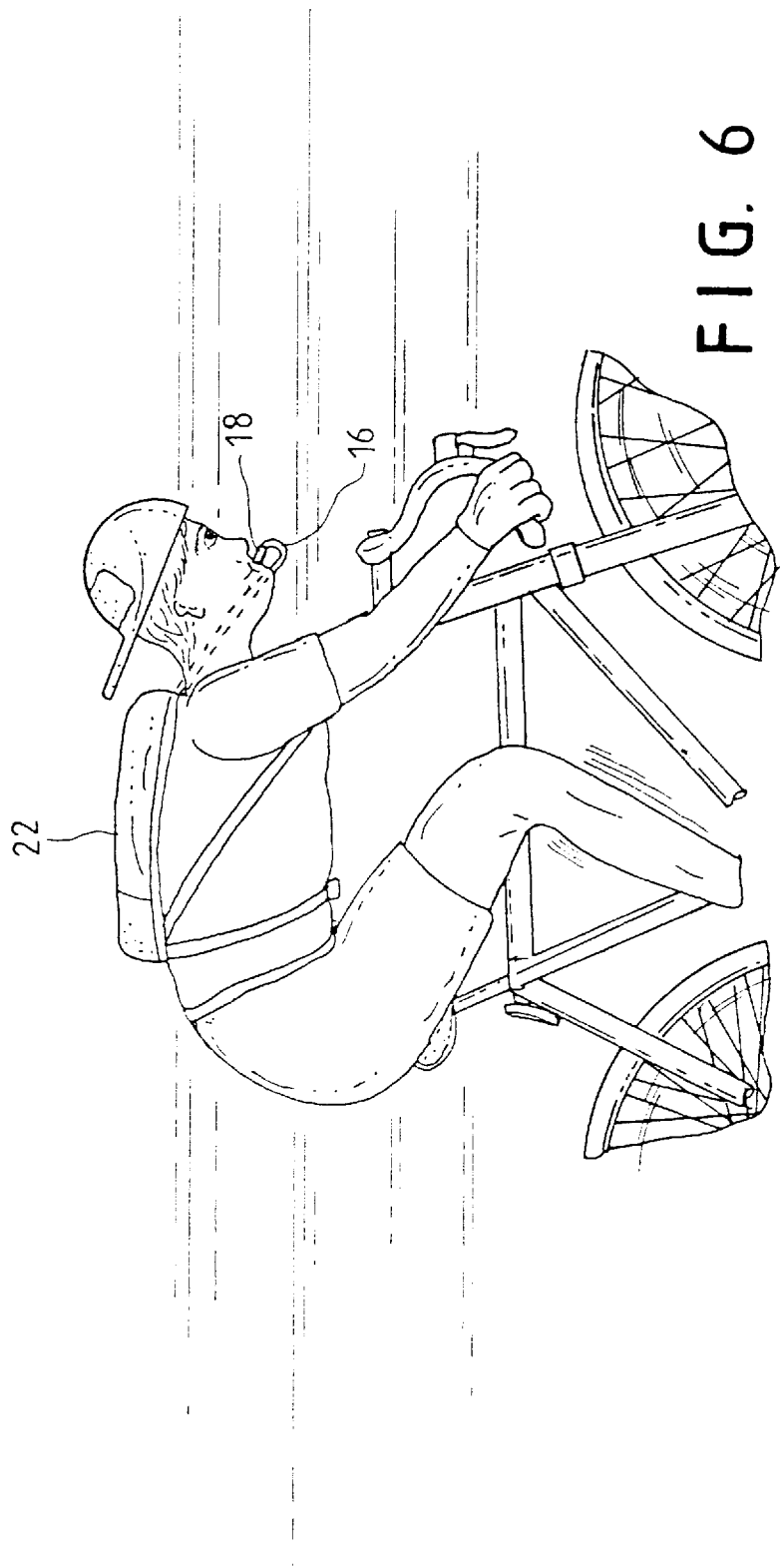

WATER DISPENSER FOR SUPPLYING WATER TO THE MOUTH OF BICYCLISTS

BACKGROUND OF THE INVENTION

1. Field of the Invention

This invention relates to an improved water dispenser for bicyclists.

2. Description of the Prior Art

Many attempts have been made to provide a water dispenser for bicyclists. Nevertheless, all water dispensers for bicyclists on the market are impractical and inconvenient to use.

U.S. Pat. No. 5,060,833 to Edison et al, entitled "CAMEL BACK", discloses a water system which includes a water container provided with a filler neck 2 having a removable closure member 3 and a mouthpiece 5 connected with the water container via a tube 4 (see FIG. 9A). The mouthpiece 5 is a tubular member in which are fitted a ball 5A and a spring 5B (see FIG. 9B). When the mouthpiece 5 is bitten down upon, the ball 5A is forced back thus allowing the water to pass therethrough. When the pressure on the mouthpiece is released, the spring 5B returns the ball 5A into the seated position.

U.S. Pat. No. 5,085,349 to Fawcett, entitled "RESILIENT VALVE AND DISPENSING SYSTEM FOR BICYCLISTS", discloses a unitary resilient valve device which includes a water container 100 provided with a filler neck 200 having a removable closure member 300 and a mouthpiece 600 connected with the water container via a tube 400 (see FIG. 10A). The mouthpiece 600 is a tubular member formed with a slit 4200 (see FIG. 10B). The slit 4200 will be forced open when the mouthpiece 600 is compressed between teeth (see FIGS. 11A and 11B).

However, these two patents still suffer from the following drawbacks:

1. As the interior of the water container has four right angled corners, it will be difficult to clean the water container thoroughly.

2. The container cannot be hung up side down for drying.

3. The mouthpiece cannot be detached from the container thereby making the water dispenser unsuitable for use with other persons.

4. The tube cannot be removed from the container thereby making it difficult to be cleaned so that it has to be disposed of when become dirty.

Therefore, it is an object of the present invention to provide an improved water dispenser for bicyclists which can obviate and mitigate the above-mentioned drawbacks.

SUMMARY OF INVENTION

This invention relates to a water dispenser for bicyclists.

It is the primary object of the present invention to provide a water dispenser for bicyclists which can be easily cleaned.

It is another object of the present invention to provide a water dispenser for bicyclists the nipple of which is replaceable.

It is still another object of the present invention to provide a water dispenser for bicyclists which is sanitary and easy to use.

It is still another object of the present invention to provide a water dispenser for bicyclists which can be placed at the market at a very low cost.

It is a further object of the present invention to provide a water dispenser for bicyclists which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 6 is a working view of the present invention;

FIG. 11 illustrates how the mouthpiece is pressed open.

DETAILED DESCRIPTION OF THE PREFERRED EMBODIMENT

Figure 1:
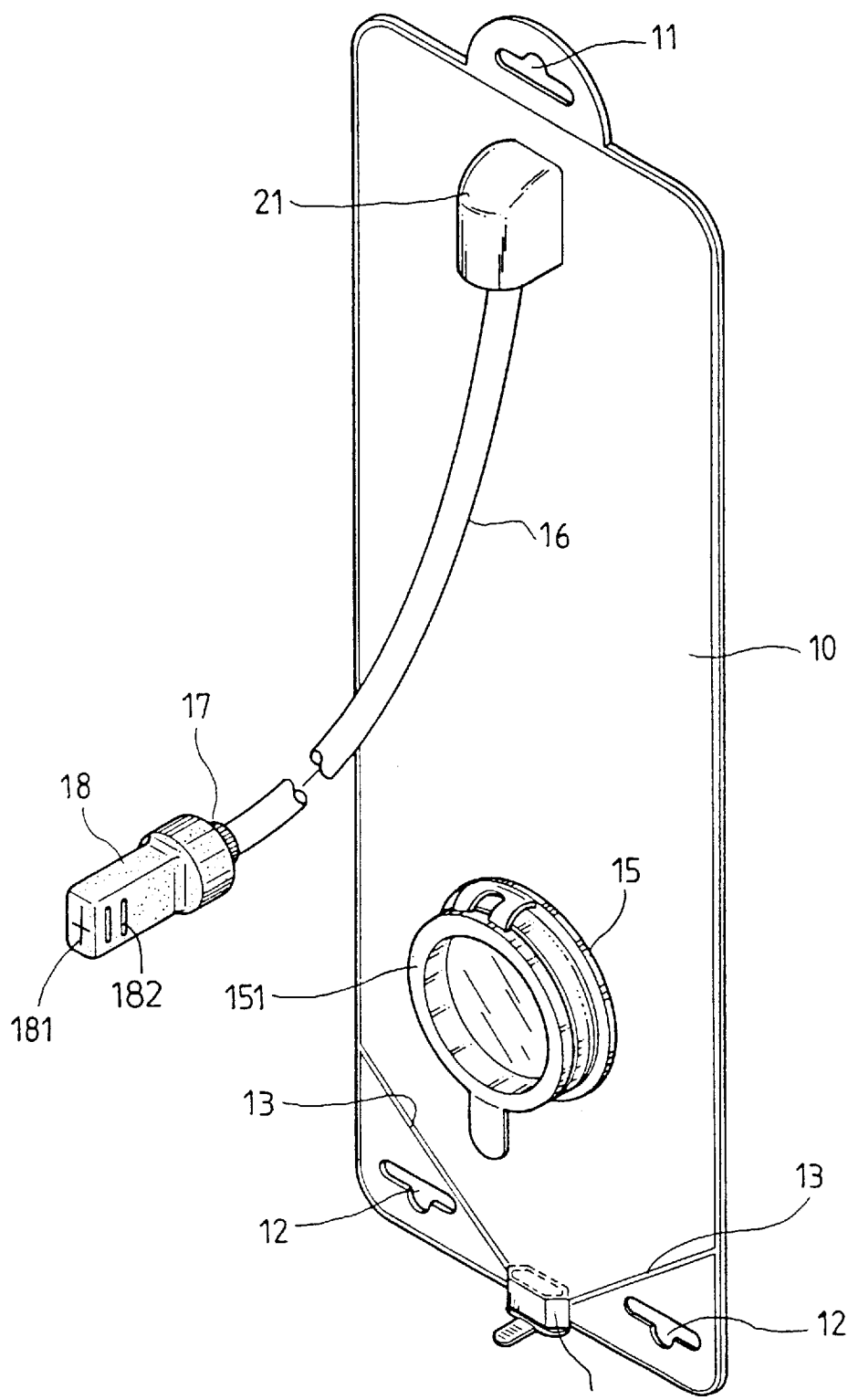
FIG. 1 is a perspective view of the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
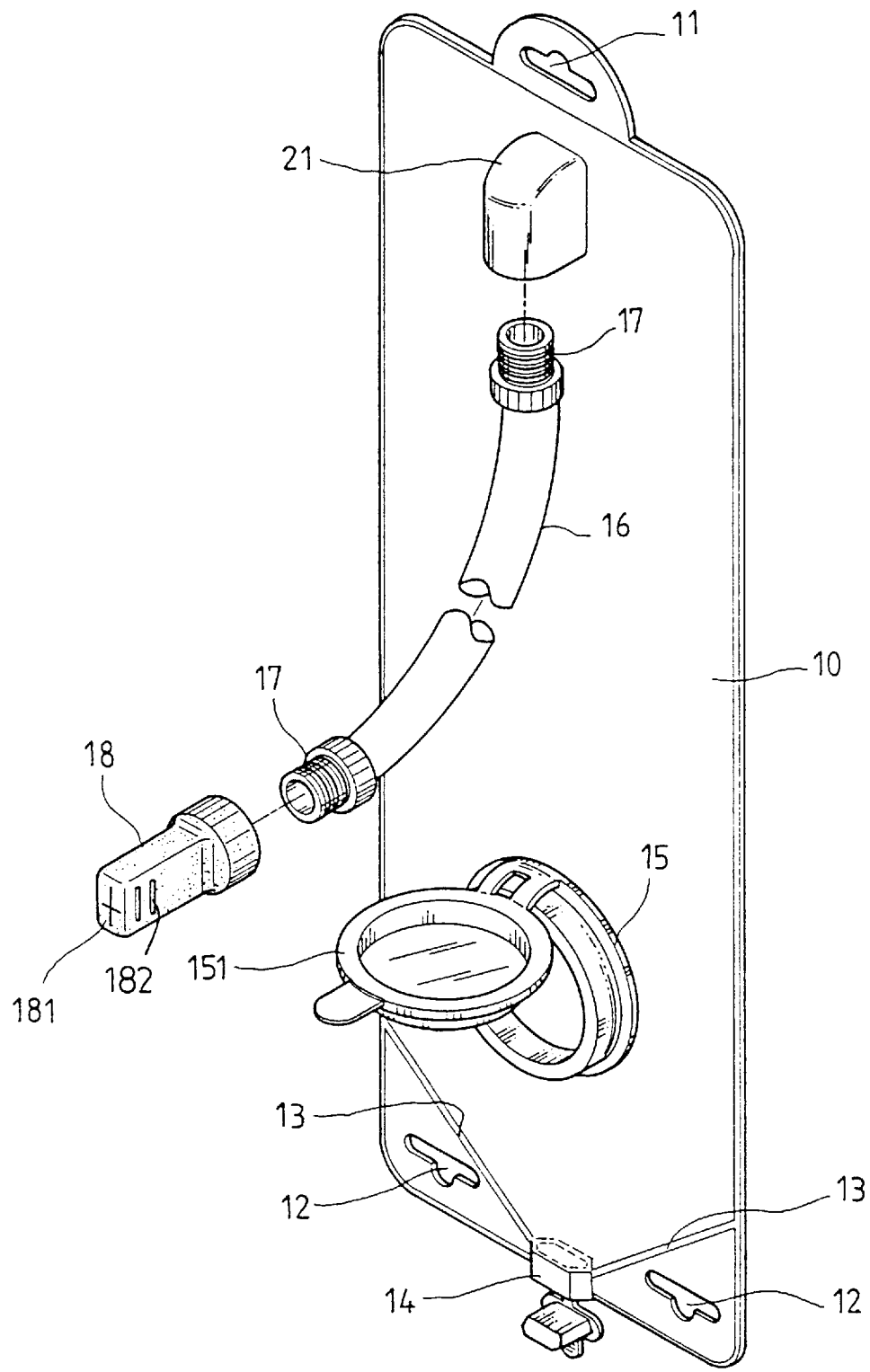
FIG. 2 is an exploded view of the present invention.
Figure 3:
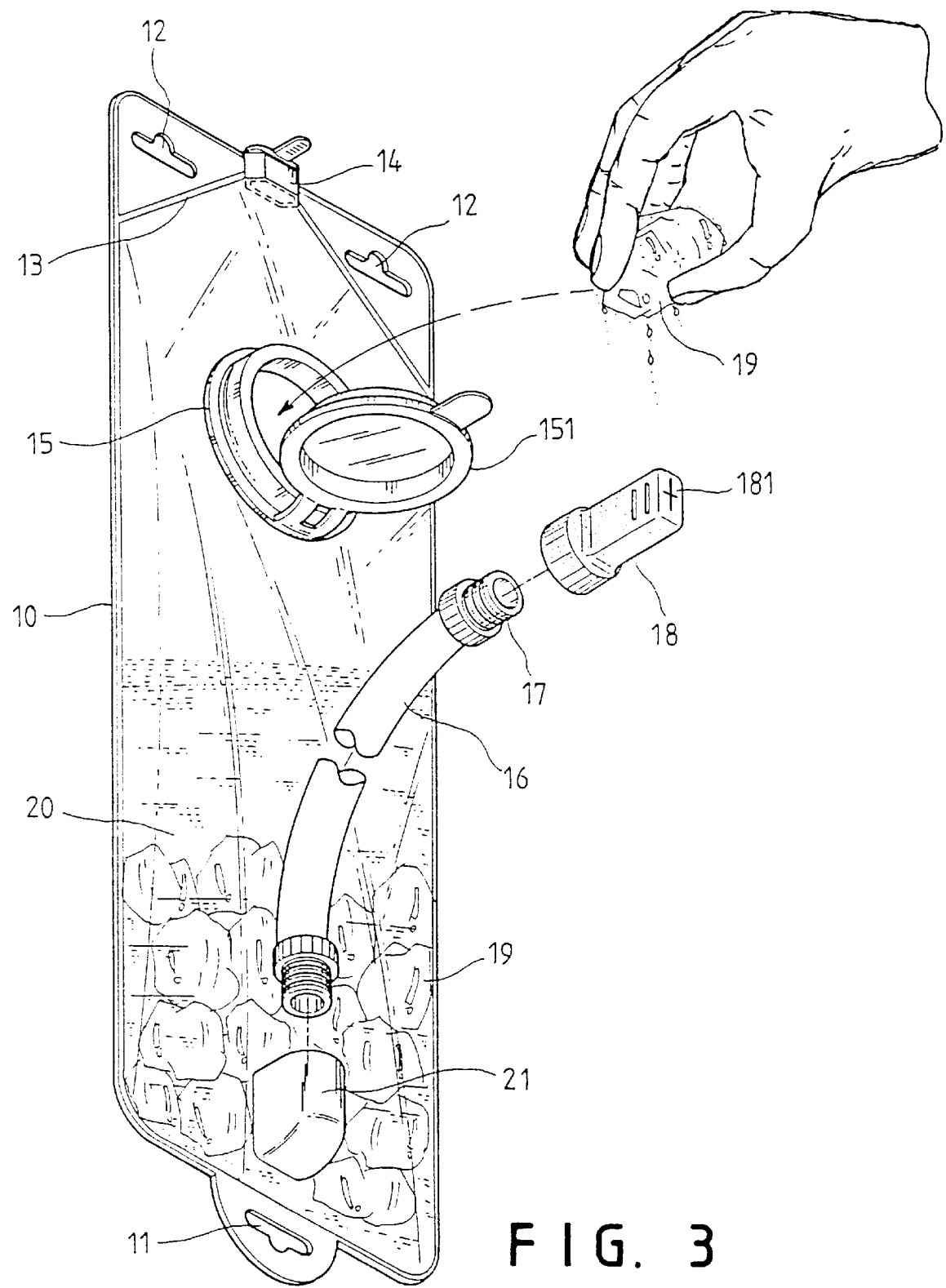
FIG. 3 illustrates how to put ice blocks into the present invention.

With reference to the drawings and in particular to FIGS. 1 and 2 thereof, the water dispenser for bicyclists according to the present invention mainly comprises a container 10, a tube 16, and a nipple 18.

As illustrated, the container 10 is a rectangular bag which is formed with a slot 11 at the upper side and two slots 12 at the bottom corners. Further, the container 10 has an outlet 21 close to the upper edge, a valve 14 at the lower edge, and a water inlet 15 close to its lower edge and located above the valve 14. The outlet 21 is formed with internal threads (not shown). The water inlet 15 is provided with a cover 151 for preventing water from flowing out of the container 10. The inner bottom of the container 10 is provided with two inclined seams 13 extending from respective vertical sides of the container 10 to the valve 14. The tube 16 is a flexible pipe provided with a threaded connector 17 at both ends thereof. A threaded connector 17 of the tube 16 is adapted to engage with the outlet 21.

The nipple 18 is made of rubber, which has a cross slit 181 at the outer end, a plurality of protuberances 182 at both sides, and an internally threads (not shown) at the inner end. The inner end of the nipple 18 is threadedly engaged with the other threaded connector 17 of the tube 16.

Figure 4:
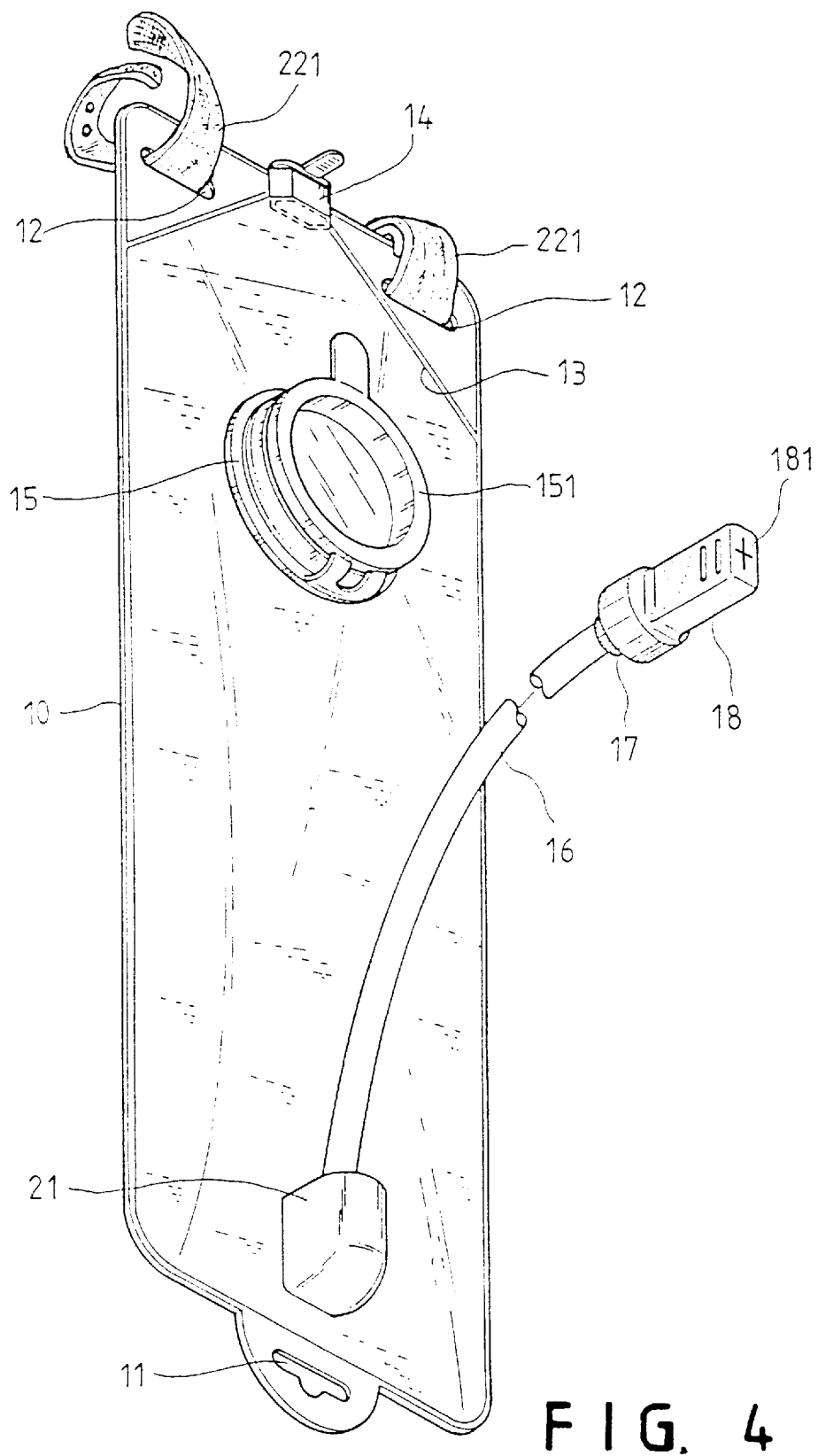
FIG. 4 illustrates how to connect two fastener means with the bag.
Figure 5:
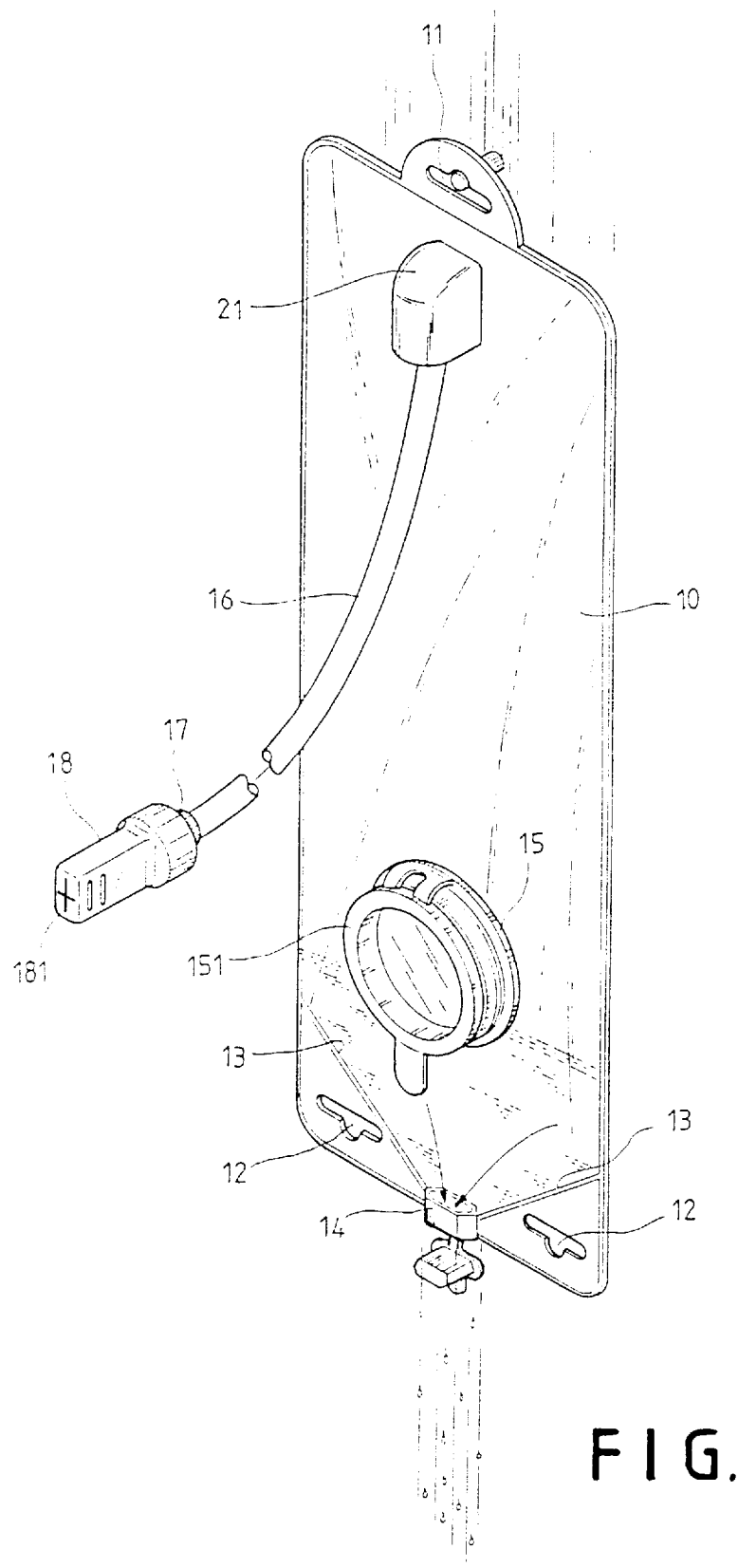
FIG. 5 is a perspective view showing that the present invention is hung up side down for drying.

Referring to FIG. 4, the slots 11 at the upper side of the container 10 are connected with two straps 221 so that the container 10 can be conveniently hung in a pack 22 (see FIG. 6) on the back of a bicyclist thereby preventing the container 10 from falling to the bottom of the pack 22.

After use, it is only necessary to clean the interior of the container 10 with water and then hang the container 10 up side down thereby letting out the water from the container 10. The inclined seams 13 make sure that all water will be discharged from the container 10.

FIG. 6 is a working view of the present invention.

Figure 8:
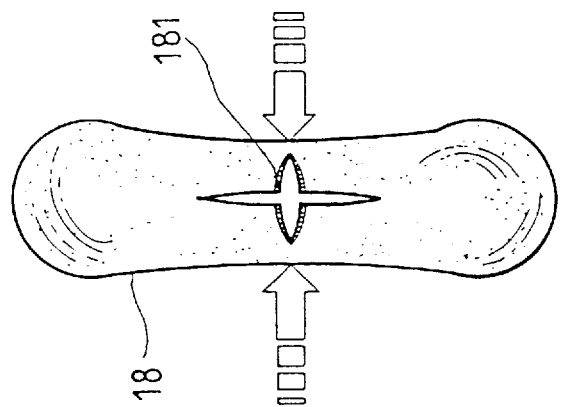
FIG. 8 illustrates how the nipple is pressed open.
Figure 7:
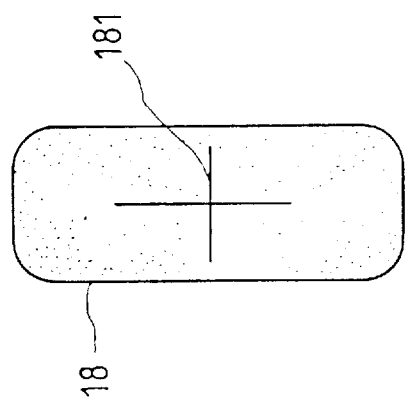
FIG. 7 is a front side of the nipple.
Figure 9A:
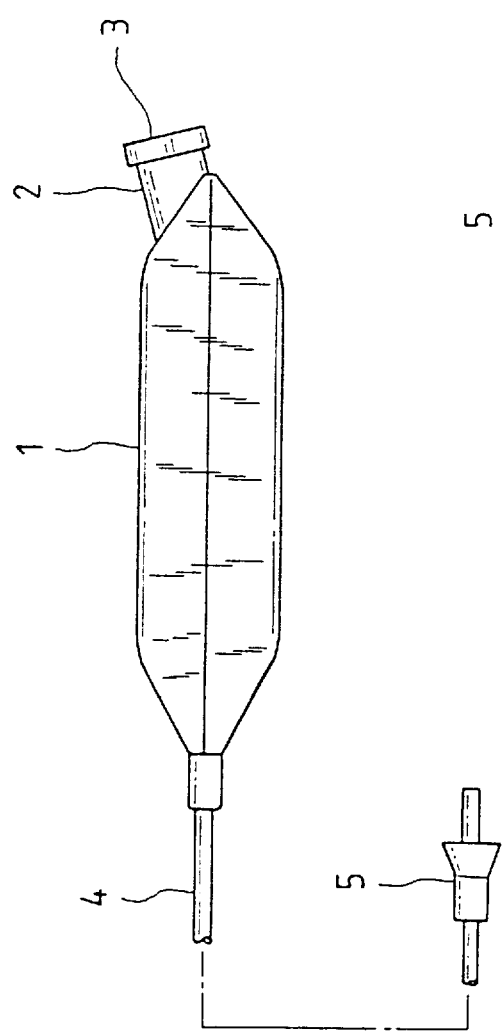
FIG. 9A shows a prior art water dispenser for bicyclists.
Figure 9B:
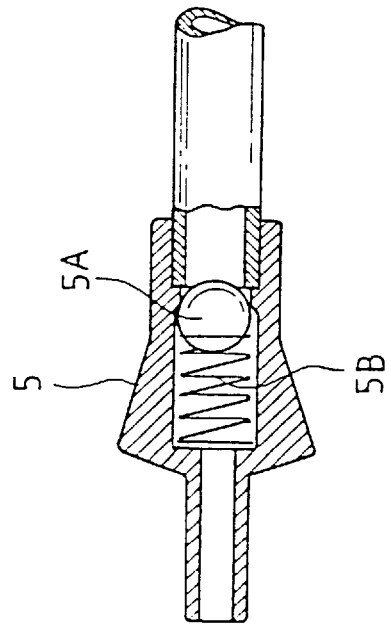
FIG. 9B is a sectional view of the mouthpiece shown in FIG. 9A.
Figures 10A, 10B:
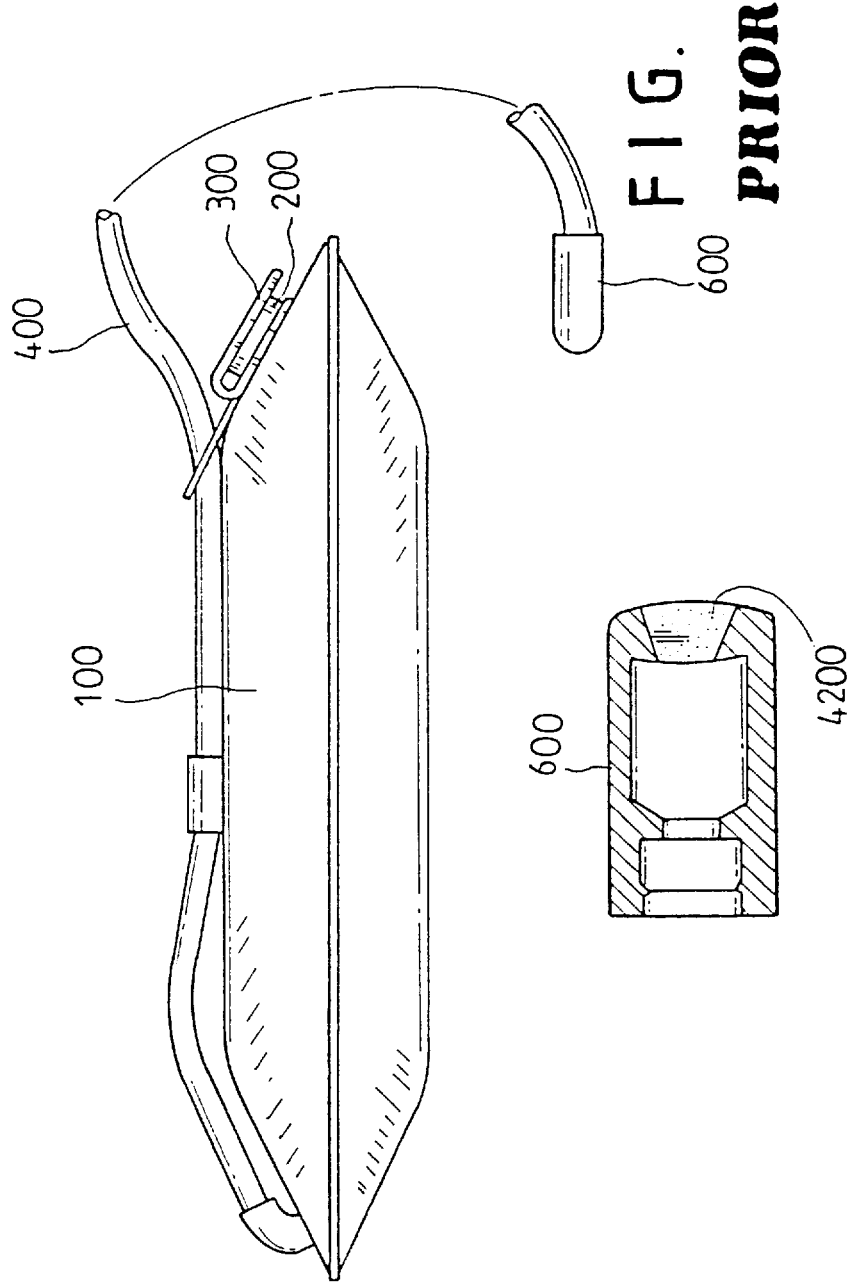
FIG. 10A shows another prior art water dispenser for bicyclists.
FIG. 10B is a sectional view of the mouthpiece shown in FIG. 10A.
Figure 11B:
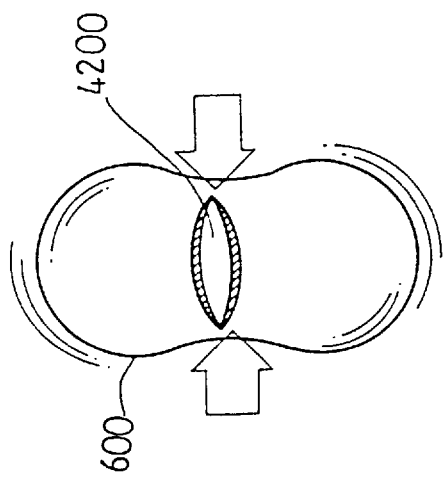
FIG. 11 is a front view of the mouthpiece shown in FIG. 10A.
Figure 11A:
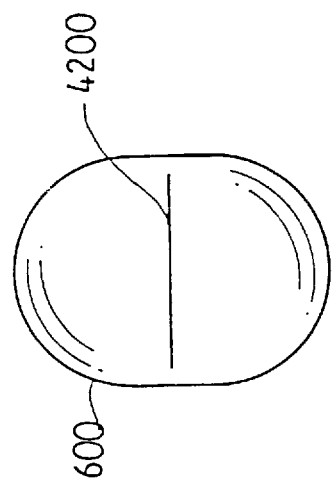

Referring to FIGS. 7 and 8, the nipple 18 is a rubber member provided with a cross slit 181 at the outer end and a plurality of protuberances 182 at both sides. The cross slit 181 will be open when compressed between teeth of a bicyclist, but will keep closed when not in compression. The protuberances 182 are designed for the reinforcing the structure of the nipple 18.

It should be noted that when the water dispenser is to be used by another person, it is only necessary to replace the nipple 18 with a new one thereby keeping sanitary in use and preventing communication of disease by agency of saliva.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A water dispenser for bicyclists comprising:

a container having a first slot at an upper side thereof, an outlet close to said upper side, an inlet close to a lower side thereof and provided with a cover, a valve arranged at said lower side, two inclined seams extending from respective vertical sides thereof to said valve, and two second slots at respective bottom corners thereof;

a tube provided with a threaded connector at both ends and adapted to threadedly engage with said outlet at an end; and a nipple threadedly engaged with another end of said tube.

2. The water dispenser for bicyclists as claimed in claim 1, wherein said nipple is formed with a cross slit at an outer end thereof.

\* \* \* \* \*